(12) United States Patent
Galasso

(10) Patent No.: US 6,915,190 B2
(45) Date of Patent: Jul. 5, 2005

(54) METHOD AND SYSTEM FOR ACQUIRING AND RECORDING DATA RELATIVE TO THE MOVEMENT OF AN AIRCRAFT

(75) Inventor: Franco Galasso, Rome (IT)

(73) Assignee: L.E.A.T.s.r.l., Rome (IT)

( * ) Notice: Subject to any disclaimer, the term of this patent is extended or adjusted under 35 U.S.C. 154(b) by 25 days.

(21) Appl. No.: 10/400,865

(22) Filed: Mar. 28, 2003

(65) Prior Publication Data

US 2004/0095466 A1 May 20, 2004

(30) Foreign Application Priority Data

Nov. 15, 2002 (IT) .................................... BO2002A0724

(51) Int. Cl.$^7$ ................................................. H04N 7/18
(52) U.S. Cl. ............................ 701/14; 701/28; 701/29; 701/35; 348/117; 348/143; 348/160
(58) Field of Search .............................. 701/14, 24, 28, 701/29, 35; 340/953, 973; 348/117, 143, 160

(56) References Cited

U.S. PATENT DOCUMENTS

| | | | |
|---|---|---|---|
| 5,283,643 A | | 2/1994 | Fujimoto .................... 348/143 |
| 5,742,336 A | * | 4/1998 | Lee ............................. 348/144 |
| 5,798,458 A | * | 8/1998 | Monroe ....................... 73/587 |
| 6,092,008 A | * | 7/2000 | Bateman ...................... 701/14 |
| 6,264,135 B1 | * | 7/2001 | Dacosta ..................... 244/1 R |
| 6,366,311 B1 | * | 4/2002 | Monroe ..................... 348/148 |
| 6,545,601 B1 | * | 4/2003 | Monroe ..................... 340/521 |
| 2002/0004695 A1 | | 1/2002 | Frost et al. .................. 701/35 |

* cited by examiner

Primary Examiner—Thomas G. Black
Assistant Examiner—Arthur D. Donnelly
(74) Attorney, Agent, or Firm—Harness, Dickey & Pierce, P.L.C.

(57) ABSTRACT

A method and system for acquiring and recording on-board data relative to the movement of a vehicle, whereby a sequence of images of a control panel of the vehicle is acquired by a video camera installed in a cockpit of the vehicle, and is then recorded in a storage device; at the same time, a position of the vehicle is determined by means of a satellite locating device, and the position assumed by the vehicle at the time the image is acquired is related to each image stored in the storage device.

20 Claims, 1 Drawing Sheet

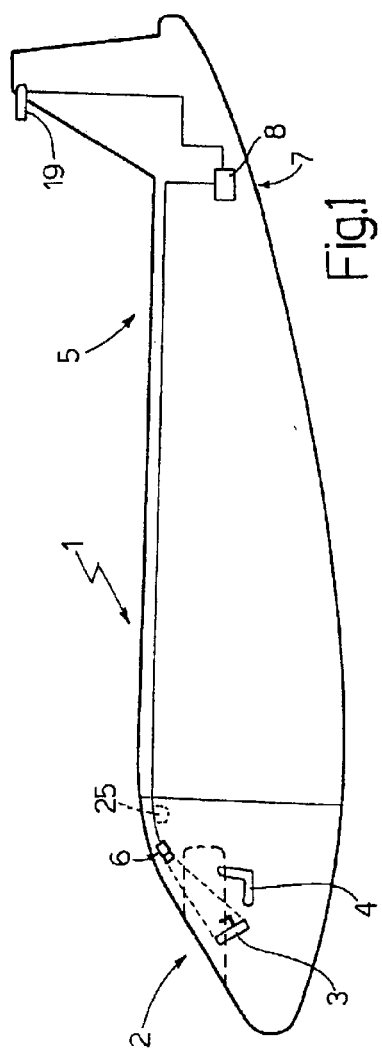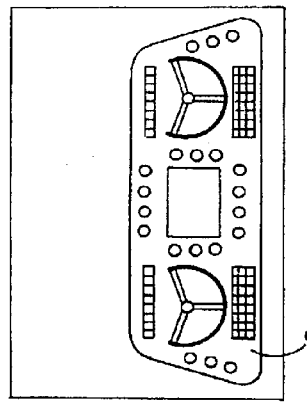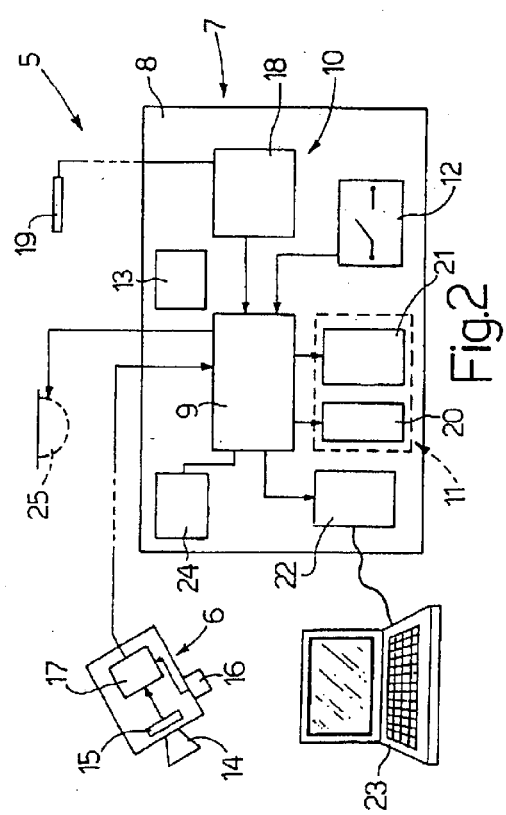

METHOD AND SYSTEM FOR ACQUIRING AND RECORDING DATA RELATIVE TO THE MOVEMENT OF AN AIRCRAFT

The present invention relates to a method and system for acquiring and recording data relative to the movement of an aircraft.

BACKGROUND OF THE INVENTION

The need to equip aircraft, in particular commercial aeroplanes, with flight data acquisition and recording units has always been acknowledged, as these are invaluable in technical and scientific investigations following an air crash, to determine the direct and indirect causes of the crash, so that technical, human, and procedural steps can be taken to prevent it happening again.

Current international regulations therefore require that any aircraft over 5,700 kg (12,500 pounds) in weight be equipped with a so-called "Flight Data Recorder" for recording flight and navigation data; and a so-called "Cockpit Voice Recorder" for recording the pilots' voices and on-board radio communications. (Normally, both these devices are integrated in a so-called "black box").

The recording devices (black boxes) normally used on commercial aeroplanes, however, are extremely expensive, and are difficult to install and even redundant in the lower aircraft range (i.e. craft of a total weight below 5,700 kg). Moreover, modern black boxes are difficult to install in existing older-generation aircraft, for reasons involving both wiring and the source of the data involved. Another important point to bear in mind is the continual increase in the amount of flight data to be recorded, with update costs that are not readily affordable. As a result, flight safety agencies are unable to definitely determine the causes of crashes involving older-generation or small aircraft not equipped with black boxes for the reasons given above.

Various solutions to the above problems have been proposed, such as the system described in Patent Application JP2002087393, which provides for acquiring and recording a sequence of aircraft control panel images. More specifically, the system comprises a video camera installed in the cockpit to cover the control panel; and a recording device, which is connected to the camera, and stores a sequence of control panel images in a bulk storage device.

Patent Application JP9307849 proposes an aircraft flight data acquisition and recording unit comprising a CCD video camera installed in the cockpit to cover the control panel; and a recording device, which is connected to the camera, stores a sequence of control panel images in a bulk storage device, and is activated by a switch controlled by a crash sensor and an alarm-status sensor.

Patent Application JP5155393 proposes an aircraft flight data acquisition and recording unit comprising a CCD video camera equipped with a microphone and installed in the cockpit to cover the control panel; and a recording device, which is connected to the camera and microphone, and stores in a bulk storage device a sequence of control panel images, the sounds from the microphone, and various flight data acquired from the on-board instruments.

The above systems, however, have all proved to be of little assistance in technical and scientific investigations into air crashes.

SUMMARY OF THE INVENTION

It is an object of the present invention to provide a method and system for acquiring and recording data relative to the movement of an aircraft, and which are designed to eliminate the aforementioned drawbacks, may be used effectively in technical and scientific investigations into air crashes, and at the same time are cheap and easy to implement.

According to the present invention, there is provided a method of acquiring and recording data relative to the movement of a vehicle; the method comprising acquiring a sequence of images of a control panel of the vehicle by means of a video camera installed in a cockpit of the vehicle, storing the sequence of images in a storage device, determining a position of the vehicle by means of a satellite locating device, and relating to each image stored in the storage device the position assumed by the vehicle at the time the image is acquired.

According to the present invention, there is provided a system for acquiring and recording data relative to the movement of a vehicle; the system comprising a video camera installed in a cockpit of the vehicle to pick up an image of the control panel of the vehicle, a storage device for storing a sequence of images picked up by the video camera, and a control device, which is connectable to a satellite locating device to determine a position of the vehicle and which relates to each image stored in the storage device the position assumed by the vehicle at the time the image is acquired.

BRIEF DESCRIPTION OF THE DRAWINGS

A non-limiting embodiment of the present invention will be described by way of example with reference to the accompanying drawings, in which:

FIG. 1 shows a schematic view of an aircraft equipped with the data acquisition and recording system according to the present invention;

FIG. 2 shows a block diagram of a control unit of the data acquisition and recording system in FIG. 1;

FIG. 3 shows, schematically, an image picked up by a video camera of the data acquisition and recording system in FIG. 1.

DETAILED DESCRIPTION OF THE INVENTION

Number 1 in FIG. 1 indicates an aircraft comprising a cockpit 2 for accommodating two pilots and equipped with a control panel 3 and two seats 4 (only one shown in FIG. 1). Aircraft 1 also comprises a data acquisition and recording system 5, in turn comprising a CCD video camera 6 installed in the roof of cockpit 2 to pick up an image of control panel 3 (shown schematically in FIG. 3), and a control unit 7 connected to camera 6 and preferably located in the luggage compartment in the tail of aircraft 1 (the tail area normally being the safest in the event of a crash).

Control unit 7 is housed inside an airtight aviation-approved housing 8 resistant to collision-induced mechanical stress and heat, and comprises a controller 9 defined by a microprocessor system for supervising operation of control unit 7; a satellite locating device 10 (operating in GPS, GNSS, EGNOS or GALILEO systems) for supplying controller 9 with the real-time position, speed, and acceleration of aircraft 1 in a three-dimensional coordinate system; a storage device 11 connected to controller 9; and a collision sensor 12 (typically a piezometric accelerometer) for supplying controller 9 with a collision signal.

Control unit 7 also comprises a power supply device 13, which supplies electric power to control unit 7 and camera 6, receives electric power from the electric circuit of aircraft 1, and comprises a known buffer battery (not shown in detail) for compensating for power failure of the electric circuit of aircraft 1 for at least five minutes' operation of control unit 7. Power supply device 13 preferably employs a switch supply system, which is extremely energy-efficient, reliable, and compact; and power supply device 13 comprises filters at the input of the electric circuit of aircraft 1 to filter high-frequency noise (generated, for example, when the engines are turned on).

Camera 6 is a CCD type, and comprises an optical system 14; a colour CCD sensor 15 connected to optical system 14; a microphone 16; and a processing device 17 connected to both CCD sensor 15 and microphone 16, and for converting the signals from sensor 15 and microphone 16 into corresponding digital signals which are then sent to controller 9 of control unit 7. Optical system 14 is preferably a macrosystem for enabling a full view of control panel 3 despite the small size of cockpit 2. In one possible embodiment, camera 6 is equipped with a lighting device (not shown) for illuminating control panel 3 in the event of lighting failure of cockpit 2 and control panel 3.

Satellite locating device 10 comprises a receiver 18 inside control unit 7; and an antenna 19 connected to receiver 18 and installed, facing upwards, outside aircraft 1. Various tests have shown that using an antenna housed inside control unit 7 greatly reduces the measuring precision of satellite locating device 10. In an alternative embodiment not shown, control unit 7 has no satellite locating device 10, and controller 9 is connected (e.g. by an NMEA-183 protocol serial port) to an on-board satellite locating device 10 of aircraft 1, from which it receives data relative to the position, speed and acceleration of aircraft 1 in a three-dimensional coordinate system.

Controller 9 is defined by a card computer, in particular a CPU PC/104 module, which has a low power drain and performs all the ordinary functions of a Personal Computer (serial ports, USB input/output, Ethernet, video, parallel port, keyboard, mouse . . . ); and controller 9 preferably employs a Linux operating system.

Storage device 11 comprises solid-state memories, which are much stronger and reliable than disk memories, by having no moving parts. More specifically, storage device 11 comprises two PCMCIA or UP-TO-DATE standard memory cards 20 and 21, which, in a preferred embodiment, are housed in different parts of housing 8. More specifically, one memory card 20 is located close to an outer wall of housing 8, where it can be removed easily from housing 8 by opening a door (not shown) with a security lock; while the other memory card 21 is located well inside housing 8, where it is extremely well protected and can only be removed by painstakingly dismantling control unit 7.

Finally, control unit 7 has a communication port 22 protected by a door (not shown) with a security lock, and for serial, parallel or USB transmission protocol connection of controller 9 to an external computer.

In actual use, control unit 7 acquires and stores in storage device 11 a sequence of data relative to the flight of aircraft 1. More specifically, data recording in storage device 11 is started automatically by controller 9 when the ground speed of aircraft 1 exceeds a given threshold, and providing the main electric power supply from the electric circuit of aircraft 1 or the secondary electric power supply from the buffer battery of power supply device 13 is active. Recording is deactivated automatically by controller 9 when the ground speed of aircraft 1 is below the given threshold for a first given time interval, or after a second given time interval following collision detected by collision sensor 12.

At predetermined time intervals, controller 9 picks up and records in storage device 11 both the image acquired by camera 6 of control panel 3, and the corresponding position, speed, and acceleration of aircraft 1 in a three-dimensional coordinate system. In other words, both an image of control panel 3 and the position, speed, and acceleration of aircraft 1 at the time the image of control panel 3 is acquired are stored at predetermined time intervals in storage device 11.

Given the limited capacity of storage device 11, data is recorded in storage device 11 on a FIFO (First IN First Out) basis, so that storage device 11 retains data relative to a given flight time window of aircraft 1.

Controller 9 preferably implements image-compression software to reduce the size of each image stored in storage device 11 to an absolute minimum; and implements data encryption software to store encrypted data in storage device 11.

Encryption of the data in storage device 11, to prevent the data being read without the encryption key, is necessary to prevent illegal use (typically, to safeguard the right to privacy of the pilots).

In one possible embodiment, controller 9 also stores in storage device 11 an audio recording of the sounds picked up by microphone 16 in cockpit 2, and which are obviously stored, highly compressed, in storage device 11 to minimize memory occupancy. To further reduce memory occupancy, controller 9 may only store in storage device 11 cockpit 2 sounds not forming part of the usual background noise of aircraft 1, i.e. only the pilot's voice and any anomalous noise.

As stated, storage device 11 comprises two memory cards 20 and 21, in both of which, controller 9 preferably records the same flight data of aircraft 1, but less data per unit time in memory card 20 than in memory card 21. That is, data is stored in memory card 21 at a rate of approximately 1–4 images per second, and in memory card 20 at a rate of approximately 2–10 images per minute, so that flight data relative to a fairly short time window (approximately 5–10 minutes) is stored at a fast rate in memory card 21, and flight data relative to a long time window (approximately 1–5 hours) is stored at a slow rate in memory card 20. The data stored in memory card 21 is typically used for technical and scientific investigation purposes following a crash, and the data stored in memory card 20 for flight monitoring purposes. The above use of memory cards 20 and 21 obviously also provides for redundant flight data storage.

To read the data on memory cards 20 and 21, these must be removed from housing 8 as described previously, or an external computer 23 with read-only access to the data on memory cards 20 and 21 may be connected to communication port 22.

Obviously, to read the flight data stored on memory cards 20 and 21, the external computer 23 must be equipped with decoding software complete with the encryption key used to store the flight data. External computer 23 preferably employs flight data processing software which displays the flight path of aircraft 1 on a WGS 84 (World Geodetic System 1984) map in a first window on a screen connected to external computer 23, and which displays, in a second window on the screen and for each point along the path, the respective control panel 3 image picked up when aircraft 1 was at that particular point along its path. Details of the control panel 3 image may, of course, be enlarged to read the instruments on control panel 3. In a third window on the screen, the flight data processing software displays the movement (including position, speed and acceleration) of the aircraft along three axes, with a choice of three-dimensional views. In other words, the flight data processing software displays, on an appropriate flight mapping medium, the flight path of aircraft 1 synchronized with a visual recording of the instruments on control panel 3 of aircraft 1.

It is important to note that the image picked up by camera 6 shows control panel 3 of aircraft 1, and therefore both the instrument readings and the manual operations performed by the pilot on control panel 3, thus enabling an extremely accurate reconstruction of in-flight events in cockpit 2 of aircraft 1.

In one embodiment, control unit 7 comprises a preferably WI FI radiofrequency communication device 24 for transmitting flight data of aircraft 1 to a ground control station. Depending on the bandwidth of communication device 24, the ground control station may be sent all or only some of the data acquired by controller 9 (e.g. all the data acquired by satellite locating device 10, and only some of the images from camera 6); and flight data of aircraft 1 may be transmitted to the ground control station either constantly, or only by specific request of the ground control station.

In an alternative embodiment, data acquisition and recording system 5 comprises a sound/light alarm 25 (shown by the dash line in the accompanying drawings) installed in cockpit 2 and for warning the pilot of a potentially hazardous situation. More specifically, controller 9 may be designed to operate alarm 25 to emit short voice messages indicating the type of potential hazard. One typical application of alarm 25 is to warn the pilot that, according to the information received from satellite locating device 10, the aircraft is on a collision course with a fixed obstacle or the ground.

In a further embodiment, controller 9 implements image analysis software for analyzing the images picked up by camera 6 to determine the values shown on the control panel instruments. Since a vector of values corresponding to the values shown on the control panel instruments occupies much less memory space than an image picked up by camera 6, the vector of values corresponding to the values shown on the control panel instruments may be stored in storage device 11 or transmitted to the ground control station instead of the images picked up by camera 6. Finally, the vector of values corresponding to the values shown on the control panel instruments may be used to generate a pilot-warning signal by means of alarm 25; for which purpose, said values may be compared with predetermined thresholds or with values supplied by satellite locating device 10.

Data acquisition and recording system 5 is based on the realization that, as opposed to simply acquiring digital images of control panel 3, including the instruments, the GPS-EGNOS-GALILEO system signals must also be exploited to relate the spatial position of aircraft 1 to each image, and so obtain a faithful reconstruction of the three-dimensional path of aircraft 1 matched at each individual stage to the images of control panel 3. Reconstructing, on a suitable flight mapping medium, recorded flight data and the three-dimensional flight path synchronized with the images of control panel 3 enables analysis of the flight path and of the events occurring in cockpit 2 in the final minutes preceding a crash or any other significant event.

Data acquisition and recording system 5 therefore provides air-safety agency investigators with an objective, technically reliable means of determining the direct and indirect causes of the event or events leading up to a crash. Individual flight path segments can be reanalyzed, even with virtual acceleration of the dynamic representation; any anomalous behaviour of aircraft 1 can be reconstructed by reconstructing the flight attitude along the path segments analyzed; and flight conditions can be checked by examining all the control panel instrument readings.

Data acquisition and recording system 5 may also be used for training purposes, i.e. to review and evaluate pilot performance on landing, or for making flight checks, and in particular evaluating the stress to which aircraft 1 has been subjected, on the basis of information relative to the acceleration of aircraft 1.

Compared with conventional black boxes, data acquisition and recording system 5 as described herein is extremely cheap and easy to install by not being connected to existing on-board instruments.

Data acquisition and recording system 5 therefore constitutes an event recorder, which provides for position and timing data of the utmost precision, and can be adapted to any means of transport: sea, rail, or road. Installation of system 5 on a road vehicle (car, truck or bus) is especially useful in determining with no uncertainty the cause, and therefore responsibility, of road accidents, thus greatly simplifying disputes accompanying such accidents (and typically aimed at establishing damages).

What is claimed is:

1. A method of acquiring and recording date relative to the movement of a vehicle (1); the method comprising acquiring a sequence of images of a control panel (3) of the vehicle (1) by means of a video camera (6) installed in a cockpit (2) of the vehicle (1), storing the sequence of images in a storage device (11), determining a position of the vehicle (1) by means of a satellite locating device (10), and relating to each image stored in the storage device (11) the position assumed by the vehicle (1) at the time the image is acquired.

2. A method as claimed in claim 1, wherein the position of the vehicle (1) is determined by the satellite locating device (10) in a three-dimensional coordinate system.

3. A method as claimed in claim 1, wherein the position, speed, and acceleration of the vehicle (1) are determined by the satellite locating device (10); the position, speed, and acceleration of the vehicle (1) at the time the image is acquired being related to each image stored in the storage device.

4. A method as claimed in claim 1, wherein storage of the images in the storage device (11) is activated when the ground speed of the vehicle (1) is above a predetermined threshold; storage of the image in the storage device (11) being cut off when the ground speed of the vehicle (1) is below the predetermined threshold for a first given time interval, or after a second given time interval following a collision detected by a collision sensor (12).

5. A method as claimed in claim 1, wherein the images are stored in the storage device (11) in digital storage format having a compression factor.

6. A method as claimed in claim 1, wherein the images are stored in the storage device (11) in encrypted form.

7. A method as claimed in claim 1, wherein the video camera (6) is fitted with a lighting device for illuminating the control panel (3) is insufficient.

8. A method as claimed in claim 1, wherein sounds in the cockpit (2) are acquired and stored in the storage device (11).

9. A method as claimed in claim 8, wherein the sounds in the cockpit (2) are processed to filter out the background noise typical of the vehicle (1); only the sounds in the cockpit (2) not forming part of the background noise typical of the vehicle (1) being stored in the storage device (11).

10. A method as claimed in claim 1, wherein the storage device (11) comprises solid-state memories (20, 21).

11. A method as claimed in claim 1, wherein data is store din the storage device (11) on a FIFO basis.

12. A method as claimed in claim 1, wherein the images are stored in two separate memories (20, 21) of the storage device (11) at two different respective storage rates.

13. A method as claimed in claim 1, wherein at least some of the date store din the storage device (11) is transmitted to a ground control station by means of a radiofrequency communication device (24).

14. A method as claimed in claim 1, wherein a potential hazard situation is determined by analyzing information supplied by the satellite locating device (10); and a potential hazard situation is indicated by means of a sound/light alarm (25) installed in the cockpit (2).

15. A method as claimed in claim 14, wherein the alarm (25) is controlled to emit short voice messages indicating the type of potential hazard.

16. A method as claimed in claim 1, wherein each image acquired by video camera (6) is analyzed to determine the values shown on the on-board instruments.

17. A system (5) for acquiring and recording date relative to the movement of a vehicle (1); the system comprising a video camera (6) installed in a cockpit (2) of the vehicle (1) to pick up an image of the control panel (3) of the vehicle (1), a storage device (11) for storing a sequence of images picked up by the video camera (6), and a control device (9), which is connectable to a satellite locating device (10) to determine a position of the vehicle (1) and which relates to each image stored in the storage device (11) the position assumed by the vehicle (1) at the time the image is acquired.

18. A system (5) as claimed in claim 17, and comprising the satellite locating device (10).

19. A system (5) as claimed in claim 17, wherein the storage device (11) comprises solid-state memories (20, 21).

20. A system (5) as claimed in claim 17, and comprising an external computer (23) for processing the data stored in the storage device (11) to display, on a suitable mapping medium, a path of the movement of the vehicle (1) synchronized with a reproduction of the images of the control panel (3).

* * * * *